F. H. PAGE.
WING AND SIMILAR MEMBER OF AIRCRAFT.
APPLICATION FILED APR. 27, 1921.
1,394,343.
Patented Oct. 18, 1921.
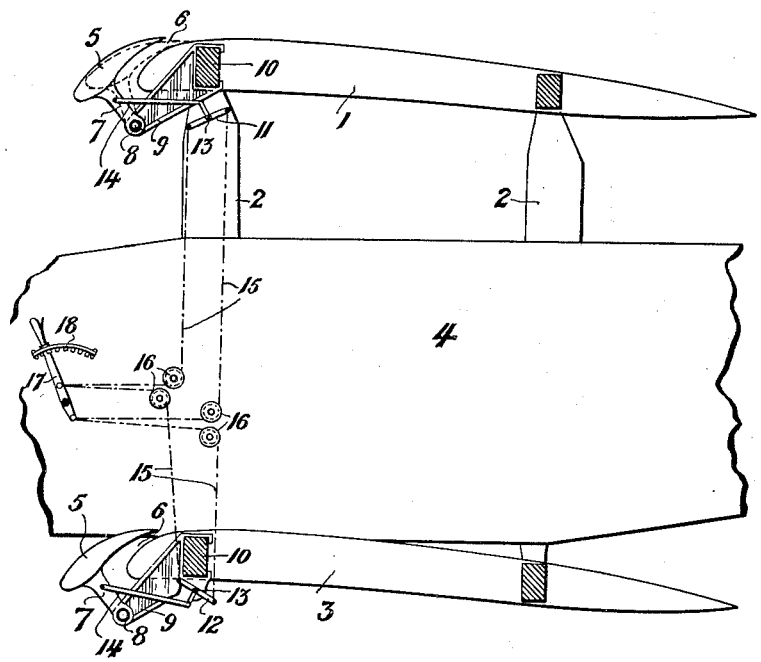
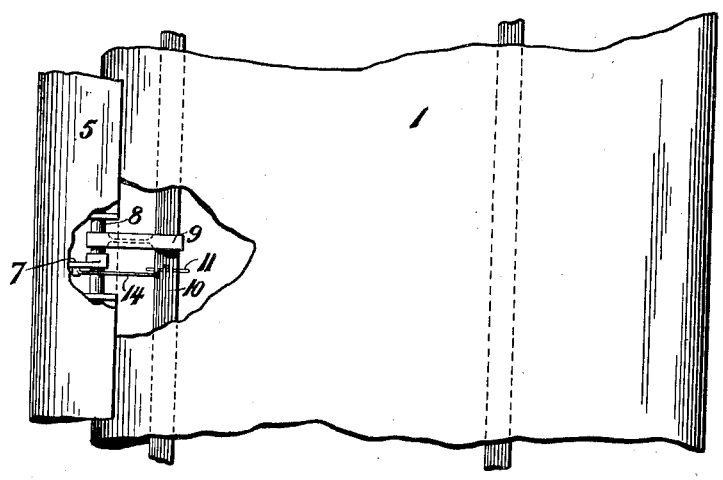

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING AND SIMILAR MEMBER OF AIRCRAFT.

1,394,343.     Specification of Letters Patent.     Patented Oct. 18, 1921.

Application filed April 27, 1921. Serial No. 464,895.

*To all whom it may concern:*

Be it known that I, FREDERICK HANDLEY PAGE, a subject of the King of Great Britain, residing at London, England, have invented certain new and useful Improvements in the Wings and Similar Members of Aircraft, of which the following is a specification.

In the specification of Patent No. 1,353,666, 21st September 1920, wings for aeroplane flying machines have been described, which wings are composed of two or more parts consisting of a wing-section main wing and a forwardly-located part or parts termed auxiliary wings, which latter are also of wing-section and are connected or formed with the main wing, but so that open slots extending substantially throughout the wing in a direction transversely of the direction of flight exist between either the auxiliary wings, or between an auxiliary wing and the main wing; in some instances the auxiliary wings are pivoted or otherwise adjustable relatively to each other and to the main wing so as to close said slots when required. In the example described in the prior specification, links pivoted on the main wing pivotally carry an auxiliary wing on their ends and by a parallel motion of the said links the auxiliary and main wings can be adjusted in distance in parallel manner, relatively to each other, to open or close the slot or slots.

Now the present invention refers to improved means for supporting the auxiliary wing or wings and for effecting the adjustment thereof relatively to the main wing and relatively to each other, whereby an auxiliary wing may be angularly adjusted to open or close the slot between itself and the main wing, and in such manner that the angular movement of adjustment of the auxiliary wing requisite to open the slot will decrease the angle of incidence of the auxiliary wing, and simultaneously displace the auxiliary wing downward and thereby increase the effective camber of the whole wing-structure.

According to the present invention the auxiliary wings are supported on arms, the ends of which are pivotally connected below the main wings either to some suitable parts of the framework of the machine or to brackets or equivalents extending from the main wing, the said pivotal connections of the arms being so located that the said auxiliary wing may be angularly adjusted to open or close the slot between itself and the main wing, and when said auxiliary wing is distanced from said main wing to open the slot, and said auxiliary wing is displaced downward and increases the effective camber of the whole wing structure.

Means are provided by which the auxiliary wings can be rocked about the pivotal axes of their carrying arms by mechanism within reach of the aviator, and as a form of construction, the arms extending from the auxiliary wings may be connected to rock-shafts carried by brackets extending downward from the main wings so that said shafts are located below the said main wings.

It will be obvious that such auxiliary wings may be located in the front or at the rear of the main wing.

The invention will be further described with reference to the accompanying drawing which shows an example of a single forwardly located auxiliary wing angularly adjustable to and from the main wing as before described, Figure 1 being a diagram sectional elevation of a portion of an aeroplane flying machine, of biplane type, and Fig. 2 is a plan view of the upper wing structure.

Referring to the drawing, the main upper wing 1 is connected by interplane struts 2 with the lower main wing 3 as will be well understood, and 4 indicates the fuselage, the upper and lower main wings 1 and 3 being of wing section.

In the construction shown a forwardly-located wing-section auxiliary wing 5 is fitted to each main wing 1 and 3, and the drawing shows the auxiliary wings 5 distanced from the main wings 1 and 3 to produce the slots 6.

The auxiliary wings 5 are fitted with downwardly extending arms 7 rigidly fixed to the auxiliary wings 5, and the lower ends of the arms 7 are fixed to rock-shafts 8 which are carried by brackets 9 respectively fixed to and extending downward from the main wings 1 and 3, and such brackets 9 may conveniently extend from the front spars 10 of the main wings 1 and 3.

By this arrangement it will be observed that when the auxiliary wings 5 are brought from the dotted position shown in respect to the upper wing structure, to the full line positions shown in both wing structures, not only will slots between the auxiliary wings and the main wings be opened, but the auxiliary wings 5 will be displaced downward relatively to the main wings and thereby the effective camber of each wing structure considered as a whole, will be increased.

As an example of means within reach of the aviator by which the auxiliary wings can be rocked about the pivotal axes of their carrying arms, reference is had to the drawing where two three-armed levers 11, 12 are pivoted at 13 to some convenient part of the machine, for instance as shown to one of the interplane struts 2.

One arm of each three-armed lever 11, 12 is connected by a pivoted link 14 to the downwardly extending arms 7 of the auxiliary wings 5.

The other two arms of each three-armed lever are connected by flexible connections 15 passing over suitable guide pulleys 16 to an operating lever 17 as shown, the position of which can be fixed by any suitable rack device 18 by which also the motion of the lever 17 can be limited.

By this means, as will be well understood, the auxiliary wing of the upper main wing and the auxiliary wing of the lower main wing can be simultaneously operated.

What I claim as my invention and desire to secure by Letters Patent is:—

1. In aeroplane flying machines; wing structures, each comprising a wing-section main wing, a wing-section auxiliary wing extending adjacent the edge of said main wing and in a direction transversely of the line of flight, downwardly extending arms on said auxiliary wing, means for pivotally supporting the lower ends of said arms, and means for rocking said arms on said pivotal supports in one direction to bring said auxiliary wing into contact with said main wing and for rocking said arms in the opposite direction on said pivotal supports to distance said auxiliary wing from said main wing to produce an open slot between said auxiliary wing and said main wing and simultaneously to displace said auxiliary wing downward relatively to said main wing to increase the effective camber of the combined structure.

2. In aeroplane flying machines; wing structures, each comprising a wing-section main wing, a wing-section auxiliary wing extending adjacent the edge of said main wing and in a direction transversely of the line of flight, a plurality of arms at distances apart fixed to said auxiliary wing and extending below said main wing, a rock-shaft to which the lower ends of said arms are fixed, members fixed to and extending from the structure of the flying machine to carry said rock-shaft, and means for angularly adjusting said rock-shaft in one direction to bring said auxiliary wing into contact with said main wing and for angularly adjusting said rock-shaft in the opposite direction to distance said auxiliary wing from said main wing to produce an open slot between said auxiliary wing and said main wing and simultaneously to displace said auxiliary wing downward relatively to said main wing to increase the effective camber of the combined structure.

3. In aeroplane flying machines; wing structures, each comprising a wing-section main wing, a small forwardly located auxiliary wing extending adjacent the forward edge of said main wing and in a direction transversely of the line of flight, a plurality of arms at distances apart fixed to said auxiliary wing and extending below the forward edge of said main wing, a rock-shaft to which the lower ends of said arms are fixed, brackets fixed to and extending from the front spar of said main wing extending downwardly and forwardly, bearings at the ends of said brackets to receive said rock-shaft, and means for angularly adjusting said rock-shaft in one direction to bring said auxiliary wing into contact with said main wing and for angularly adjusting said rock-shaft in the opposite direction to distance said auxiliary wing from said main wing to produce an open slot between said auxiliary wing and said main wing and simultaneously to displace said auxiliary wing downward relatively to said main wing to increase the effective camber of the combined structure.

4. In aeroplane flying machines; wing structures each comprising a wing-section main wing, a wing-section auxiliary wing extending adjacent the edge of said main wing and in a direction transversely of the line of flight, a plurality of arms at distances apart fixed to said auxiliary wing and extending below said main wing, a rock-shaft to which the lower ends of said arms are fixed, brackets fixed to and extending downwardly from the structure of the wing-section main wing and terminating beneath and adjacent the edge of the main wing, bearings at the ends of said brackets to receive and carry said rock-shaft, and means for angularly adjusting said rock-shaft in one direction to bring said auxiliary wing into contact with said main wing and for angularly adjusting said rock-shaft in the opposite direction to distance said auxiliary wing from said main wing to produce an open slot between said auxiliary wing and said main wing and simultaneously to displace said auxiliary wing downward relatively to said main wing to increase the effective camber of the combined structure.

5. In aeroplane flying machines; wing structures each comprising a wing-section main wing, a wing-section auxiliary wing extending adjacent the edge of said main wing and in a direction transversely of the line of flight, a plurality of arms at distances apart fixed to said auxiliary wing and extending below said main wing, a rock-shaft to which the lower ends of said arms are fixed, members fixed to and extending from the structure of the flying machine to carry said rock-shaft, a three-armed lever located beneath each main wing, pivots extending from the framework of the flying machine to carry said three-armed levers, a member extending from one arm of each of said levers to one of said arms supporting each auxiliary wing, an operating lever within reach of the aviator, means for fixing said lever in a desired position, and mechanical connections extending from said lever to the remaining two arms of each of said three-armed levers to enable a movement of adjustment of said operating lever in one direction to bring the auxiliary wings into contact with the main wings and in the other direction to distance the auxiliary wings from the main wings to produce open slots between said auxiliary wings and said main wings and simultaneously displace said auxiliary wings downward relatively to said main wings.

6. In aeroplane flying machines; a plurality of wing structures located one above another each comprising a wing-section main wing and a wing-section auxiliary wing extending adjacent the forward edge of said main wing and in a direction transversely of the line of flight, downwardly extending arms on said auxiliary wing, and means extending from the main wing for pivotally supporting the lower ends of said arms, interplane struts connecting the main wings of said wing structures, a fuselage located between said wing structures, an operating lever located in said fuselage within reach of the aviator, means for fixing said lever in desired positions, and means connecting said operating lever with the carrying arms of said auxiliary wings to bring said auxiliary wings into contact with said main wings when said operating lever is moved in one direction and to distance said auxiliary wings from said main wings to produce open slots between said auxiliary wings and said main wings and simultaneously displace said auxiliary wings downward relatively to said main wings to increase the effective camber of the combined wing structures when the operating lever is moved in the opposite direction.

In witness whereof I have hereunto set my hand in the presence of two witnesses.

FREDERICK HANDLEY PAGE.

Witnesses:
 THOMAS WILLIAM ROGERS,
 WALTER JAMES SKERTEN.